Oct. 17, 1967 W. L. CRESAP ETAL 3,347,320
ROTOR SYSTEM
Filed July 6, 1966 2 Sheets-Sheet 1
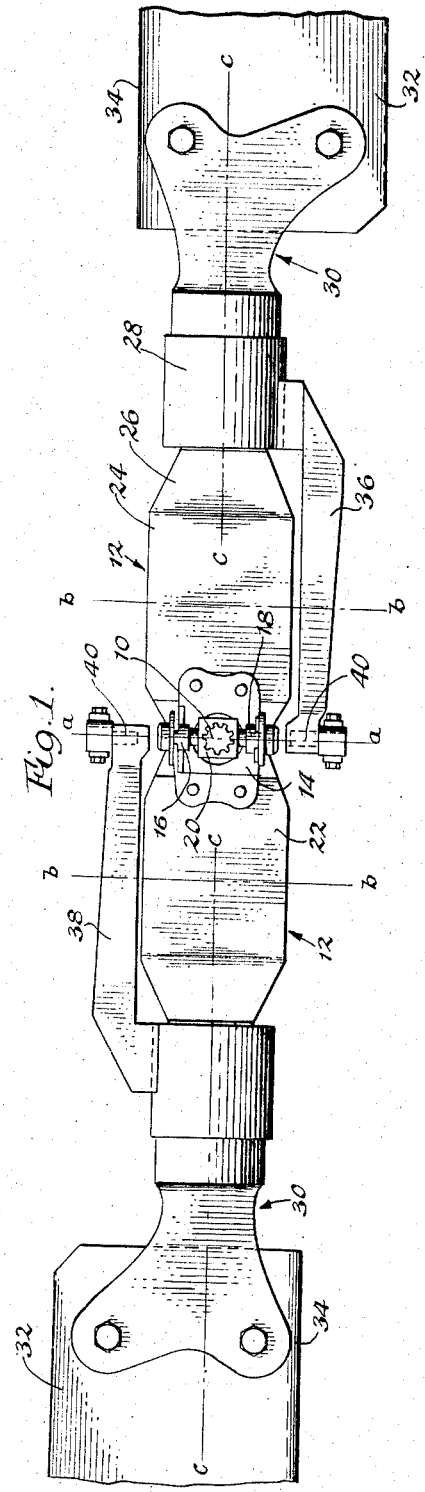
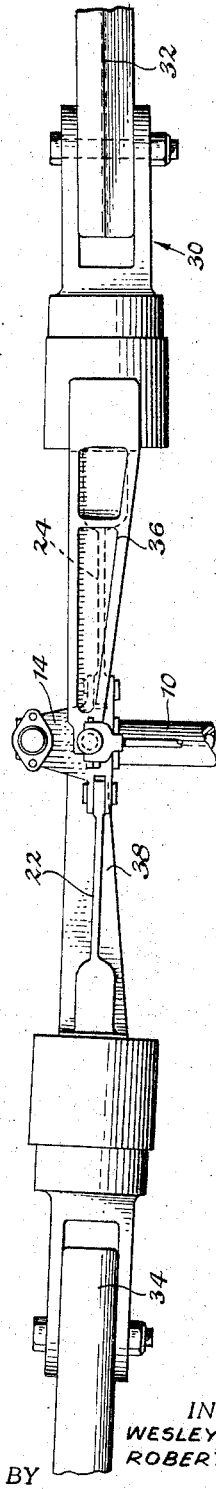
INVENTORS
WESLEY L. CRESAP
ROBERT R. LYNN
BY
Bean, Brooks, Buckley & Bean
ATTORNEYS Oct. 17, 1967     W. L. CRESAP ETAL     3,347,320
ROTOR SYSTEM
Filed July 6, 1966     2 Sheets-Sheet 2
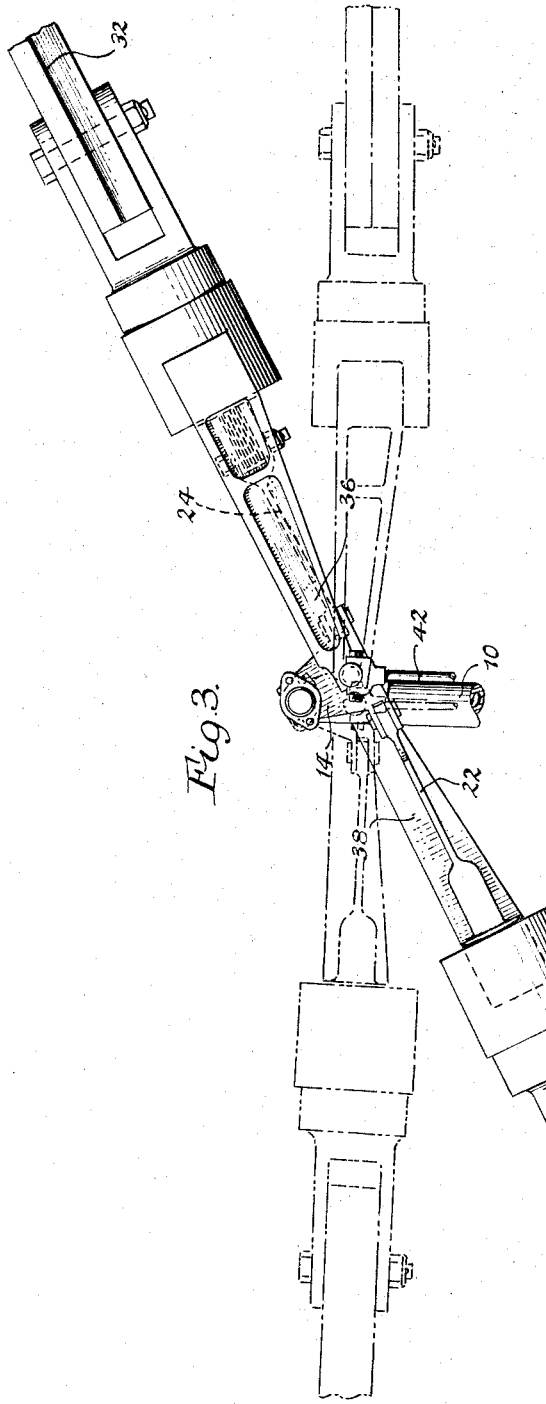
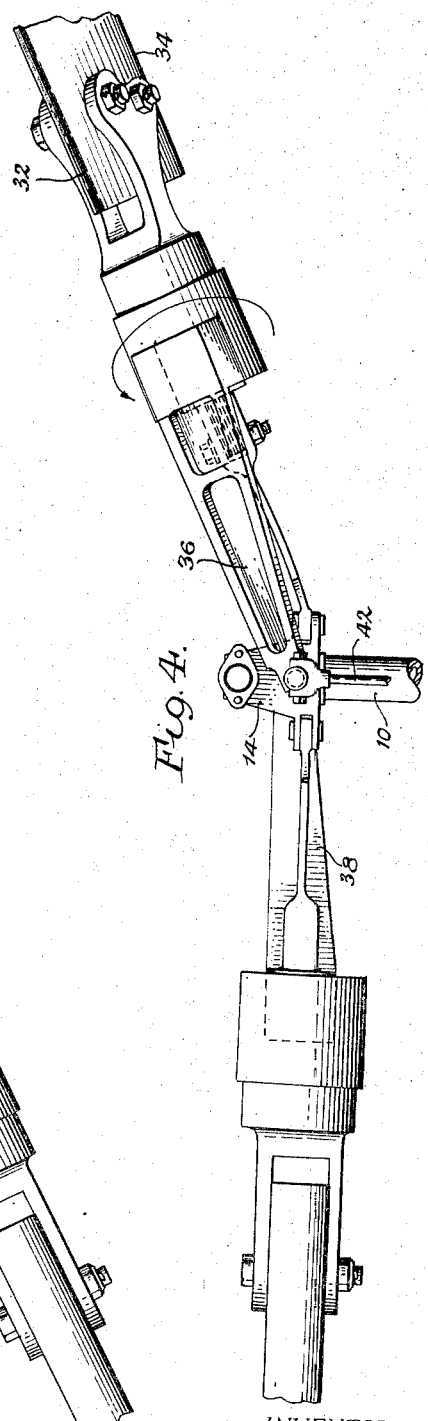
INVENTORS
WESLEY L. CRESAP
ROBERT R. LYNN
BY
*Bean, Brooks, Buckley & Bean*
ATTORNEYS

United States Patent Office 3,347,320
Patented Oct. 17, 1967

3,347,320
ROTOR SYSTEM
Wesley L. Cresap, Fort Worth, and Robert R. Lynn, Arlington, Tex., assignors to Bell Aerospace Corporation, Wheatfield, N.Y.
Filed July 6, 1966, Ser. No. 563,140
4 Claims. (Cl. 170—160.26)

This invention relates to rotary wing aircraft and is directed in particular to certain improvements in the rotor systems therefor.

A primary object of this invention is to provide an improved rotor system for rotary wing aircraft in which superior control and performance are achieved by utilizing a "see-saw" rotor assembly having flexure portions and providing compensatory pitch change in the rotor blades in response to flapping motions thereof occasioned only by flexing of the flexure portions. Specifically then, the present invention resides in the combination of a rotor pivotally connected to a mast for rocking motion about a transverse, real axis in response to cyclic pitch changes on the rotor and having, in its hub, flexure portions mounting the blades and permitting each blade to flap individually about a virtual axis radially offset from the aforementioned real rocking axis, and including pitch control means for the blades which will effect individual pitch change to the blades upon flapping about the radially offset virtual axes but will not significantly effect pitch change to the blades upon rocking of the rotor around the aforenoted transverse real axis.

More specifically, it is an object of this invention to provide an improved rotor system as aforesaid wherein the blade pitch control levers extend inwardly from the rotor blades and pivotally connect to pitch change actuators adjacent said cyclic rocking or real axis of the rotor hub and inward of the collective flapping or virtual axes of the rotor blades.

Previous rotor constructions have provided for automatic decrease of blade pitch angle with increase in rotor load, and automatic increase of blade pitch angle with decrease of rotor load by, among other means, displacement of the pivotal connection between the blade pitch horn and the pitch control link off the flapping axis of the rotor blade. The advantage of such a construction, known in the art as "delta," lies primarily in providing the rotor with a relative constancy of load. That is, the effect of a sudden application of load to the rotor, as from a gust, will be minimized because the rotor blades will automatically tend toward a decrease of pitch and, therefore, a decrease of rotor load. As a result, flight will tend to be smoother. However, in these prior constructions the automatic interaction between rotor load and blade pitch angle has necessarily been effective regardless of whether the blade flapping was of a cyclic or collective nature. In this circumstance the interaction tends to cause the rotor to deviate from its intended plane.

The rotor construction of the present invention ordinarily acts to introduce such a rotor load/blade pitch angle interaction but eliminates the interaction upon inclination of the rotor as a whole (about the rocking or real axis described).

Other objects and advantages of this invention will become apparent from the specification hereinafter and the accompanying drawing wherein:

FIG. 1 is a plan view showing a portion of a rotor assembly constructed according to this invention;

FIG. 2 is a side elevation of the assembly shown in FIGURE 1;

FIG. 3 is a diagrammatic view of the present assembly showing a rocking of the rotor and the relative disposition of component parts (with the pitch change control rod omitted) upon application of cyclic pitch change and illustrating, in conjunction with FIGURE 4, the principles of this invention; and FIG. 4 is a view similar to FIGURE 3, but showing the actual disposition of parts due to the flapping of each of the blades around its respective flexure or virtual axis.

With reference to FIGURES 1 and 2, reference character 10 indicates a conventional mast rotatably driven by conventional mechanism mounted on the aircraft, not shown. The rotor assembly according to this invention includes an elongate hub 12 having a central portion 14 mounting a pair of trunnion bearings 16 and 18 rotatably receiving the stub shafts of a trunnion member 20, the trunnion member being splined or otherwise suitably secured to the mast for rotation therewith. The hub, then, is of the "see-saw" type, being limited in movement relative to the mast to rocking motion about the transverse axis $a$—$a$ defined by the trunnion 20.

Extending radially outwardly in opposite directions from the central portion 14 of the hub 12 are a pair of flexure plate portions 22 and 24, each of which terminates in a thickened portion 26 formed with or carrying a stub shaft upon which is journalled the cuff 28 of a blade grip member 30. The cuff and stub shaft define a pitch change axis $c$—$c$ extending longitudinally of each blade 32, the details of which form no part of the present invention, but which may take any convenient form such as that shown in Patent No. 3,026,942, issued Mar. 27, 1962. The leading edge of the blade 32 shown will be understood to be indicated by the reference character 34 in FIGURE 1.

A pitch change control lever is connected to each blade grip cuff, the control levers being located at 36 and 38 in FIGURE 1. It will be noted that each control lever extends inwardly of its respective flexure plate and terminates in a connecting end portion 40 disposed essentially adjacent the rocking axis of the hub and pivotally connected to conventional pitch change control rod 42 (shown in FIGURE 4) so that cyclic and collective pitch may be imparted to the blades in conventional fashion.

In FIGURE 3, the rotor subjected to cyclic pitch change effects a rocking motion about axis $a$—$a$ as shown in full lines, whereas the portion of this rotor before the cyclic rocking is shown in phantom lines. As shown, the blades of FIGURE 3 have not been subjected to any motions about their pitch change axes as a result of the rocking motion about the axis $a$—$a$, the reason being that the pivotal connection between connecting end 40 and rod 42 is sufficiently close to the rocking axis $a$—$a$, that there is no or little motion of the pitch horn 36 around the blade pitch change axis upon rocking of the rotor around axis $a$—$a$. The pivotal connection between the rod 40 and the pitch horn 36 could be directly upon the axis $a$—$a$, in which case no motion of the pitch horn 36 about the pitch change axis would be introduced by rocking of the blade about axis $a$—$a$. However, so little motion is induced in response to rotor rocking in the arrangement of FIGURE 3 as to be immaterial so long as substantial relative pitch horn motion is induced in response to blade flapping, as is also the case with the FIGURE 3 arrangement.

To illustrate this difference between blade rocking about the axis $a$—$a$ and blade flapping about the virtual axis $b$—$b$, the right hand blade in FIGURE 4 illustrates the disposition of parts as a result of this flapping of this blade from the initial position shown in phantom lines in FIGURE 3. The effect is to change the pitch of the blade with such flapping so that the blade will tend to restore itself to its initial position; that is when the blade flaps upwardly the blade pitch will be decreased, and when the blade flaps downwardly the blade pitch will be increased.

This interaction between collective flapping and pitch change is a result of the displacement of the pivotal connection between connecting end portion 40 and rod 42 from the flexing axis b—b of the flexure portion.

It will be appreciated that whereas only one form of the invention has been illustrated and described in detail herein, various changes may be made therein without departing from the spirit of the invention or the scope of the following claims.

We claim:

1. In a rotary wing aircraft,
a rotor mast,
an elongate rotor hub having a centrally disposed mounting portion,
means securing the mounting portion of said hub to said mast for rotation therewith and for rocking motion relative thereto about an axis transverse of said hub and normal to the mast,
said hub also including a pair of flexure plate portions projecting in opposite directions from said mounting portion, and a rotor blade mounting portion at the free end of each flexure plate portion, said flexure plate portions being dimensioned to flex about virtual axes parallel to and displaced outwardly from the rocking axis of said hub,
a pair of rotor blades,
means mounting said rotor blades on respective ends of said blade mounting portions of said hub for pivotal motions about pitch change axes extending longitudinally of the respective blades,
a pitch control lever rigidly secured to each blade and extending inwardly therefrom to lie alongside the central portion of said hub and inwardly of the virtual axis of said flexure plate portion, and
a pair of pitch control actuators pivotally connected to respective ends of said control levers at points lying inwardly of said virtual axes whereby flapping motion of a blade about its virtual axis effects pitch change motion of the blade in such direction as to restore the blade to its initial position prior to such flapping.

2. In a rotary wing aircraft having a mast and a rotor assembly including a hub attached to said mast for rocking motion about a real axis normal to and intersecting the axis of said mast, a plurality of blades attached to said hub for rotation therewith and mounted thereon for oscillation about longitudinal pitch change axes extending longitudinally of the blades, and flexure portions on said hub for allowing individual blade flapping about virtual axes radially offset from said real axis and independently of rocking motion of the hub about said real axis, the improvement consisting of:

pitch control means connected to each blade for changing the pitch of the associated blade about its longitudinal pitch change axis, said pitch control means comprising a member rigidly fixed to each blade and projecting therefrom inwardly to terminate in an inner end spaced laterally from a corresponding virtual axis and a pitch change actuator pivotally connected to the inner end of each member whereby flapping motion of a blade about its virtual axis effects pitch change motion of the blade in such direction as to restore the blade to its initial position prior to such flapping.

3. In a rotary wing aircraft,
a rotor mast,
an elongate rotor hub having a centrally disposed mounting portion,
means securing the mounting portion of said hub to said mast for rotation therewith and for rocking motion relative thereto about an axis transverse of said hub and normal to the mast,
said hub also including a pair of flexure plate portions projecting in opposite directions from said mounting portion, and a rotor blade mounting portion at the free end of each flexure plate portion, said flexure plate portions being dimensioned to flex about virtual axes parallel to and displaced outwardly of the rocking axis of said hub,
a pair of rotor blades,
means mounting said rotor blades on respective ends of said blade mounting portions of said hub for pivotal motions about pitch change axes extending longitudinally of the respective blades,
a pitch control lever rigidly secured to each blade and extending inwardly therefrom to lie alongside the central portion of said hub,
and a pair of pitch control actuators pivotally connected to respective ends of said control levers at points inwardly of said virtual axes whereby flapping motion of a blade about its virtual axis effects pitch change motion of the blade in such direction as to restore the blade to its initial position prior to such flapping.

4. In a helicopter,
a mast,
a blade assembly carried by said mast for rotation thereby, said blade assembly including a rotor hub and a pair of blades each connected to said hub for pivotal motion relative thereto about pitch change axes extending longitudinally of the respective blades, and bearing means connecting said hub to said mast about a real flapping axis transverse to said blades,
said rotor hub having a flexure plate portion for each blade defining a virtual flapping axis lying between each respective blade and said real flapping axis,
a pitch control lever rigidly secured to each blade and extending radially inwardly thereof past the respective virtual flapping axis to lie alongside said mast,
a pair of pitch control actuators pivotally connected to respective ones of said control levers at points lying inwardly of said virtual axes whereby flapping motion of a blade about its virtual axis effects pitch change motion of the blade in such direction as to restore the blade to its initial position prior to such flapping.

References Cited

UNITED STATES PATENTS

| 2,830,669 | 4/1958 | Klockner. | |
| 3,026,942 | 3/1962 | Cresap | 170—160.53 X |
| 3,193,018 | 7/1965 | Gandy | 170—160.26 X |
| 3,228,479 | 1/1966 | Nagler | 170—160.27 |

FOREIGN PATENTS

| 751,109 | 6/1956 | Great Britain. |

MARTIN P. SCHWADRON, *Primary Examiner.*

EVERETTE A. POWELL, JR., *Examiner.*